United States Patent [19]
Fok et al.

[11] Patent Number: 5,961,627
[45] Date of Patent: Oct. 5, 1999

[54] HIGH SPEED SWITCH FOR HIGH SPEED CONNECTION BETWEEN COMPUTERS AND PERIPHERAL DEVICES

[75] Inventors: Simon Fok, Militas; Chung Liang Yen, San Jose, both of Calif.

[73] Assignee: Gigalabs, Inc, Sunnyvale, Calif.

[21] Appl. No.: 08/878,081

[22] Filed: Jun. 18, 1997

[51] Int. Cl.[6] .................................................. G06F 13/00
[52] U.S. Cl. .......................................... 710/131; 710/132
[58] Field of Search .................................. 710/131, 132, 710/129, 126, 100, 101, 2

[56] References Cited

U.S. PATENT DOCUMENTS

| | | | |
|---|---|---|---|
| 4,947,387 | 8/1990 | Knorpp et al. ............................... | 370/60 |
| 4,955,054 | 9/1990 | Boyd, Jr. et al. ........................ | 379/269 |
| 5,144,297 | 9/1992 | Ohara .................................. | 340/825.79 |
| 5,164,939 | 11/1992 | Shobatake .................................. | 370/60 |
| 5,241,630 | 8/1993 | Lattin, Jr. et al. ....................... | 395/325 |
| 5,257,393 | 10/1993 | Miller ................................. | 395/200.54 |
| 5,261,059 | 11/1993 | Hedberg et al. ......................... | 395/325 |
| 5,469,154 | 11/1995 | Karp ...................................... | 340/825.8 |
| 5,699,533 | 12/1997 | Sakai ....................................... | 395/312 |
| 5,717,871 | 2/1998 | Hsieh et al. ............................. | 395/312 |
| 5,745,709 | 4/1998 | Okabayashi et al. .................... | 395/311 |

*Primary Examiner*—Ayaz R. Sheikh
*Assistant Examiner*—Xuong Chung-Trans

[57] ABSTRACT

A switch assembly for connecting computers to SCSI peripheral devices in order to pipe data directly from computer to peripheral devices without the use of LAN switches or NICs. The assembly comprises a crosspoint switch having a plurality of input terminals and a like plurality of output terminals. The assembly also includes a like plurality of connection ports; and a like plurality of interconnection device. Each interconnection device is connected between a corresponding connection port and a corresponding input terminal. Each interconnection device includes an SCSI control section connected to the corresponding connection port and a switch control section connected to the corresponding input terminal. Each interconnection device also includes a CPU, a table memory, a buffer memory and an internal system bus connected to both sections, both memories and said CPU.

4 Claims, 1 Drawing Sheet

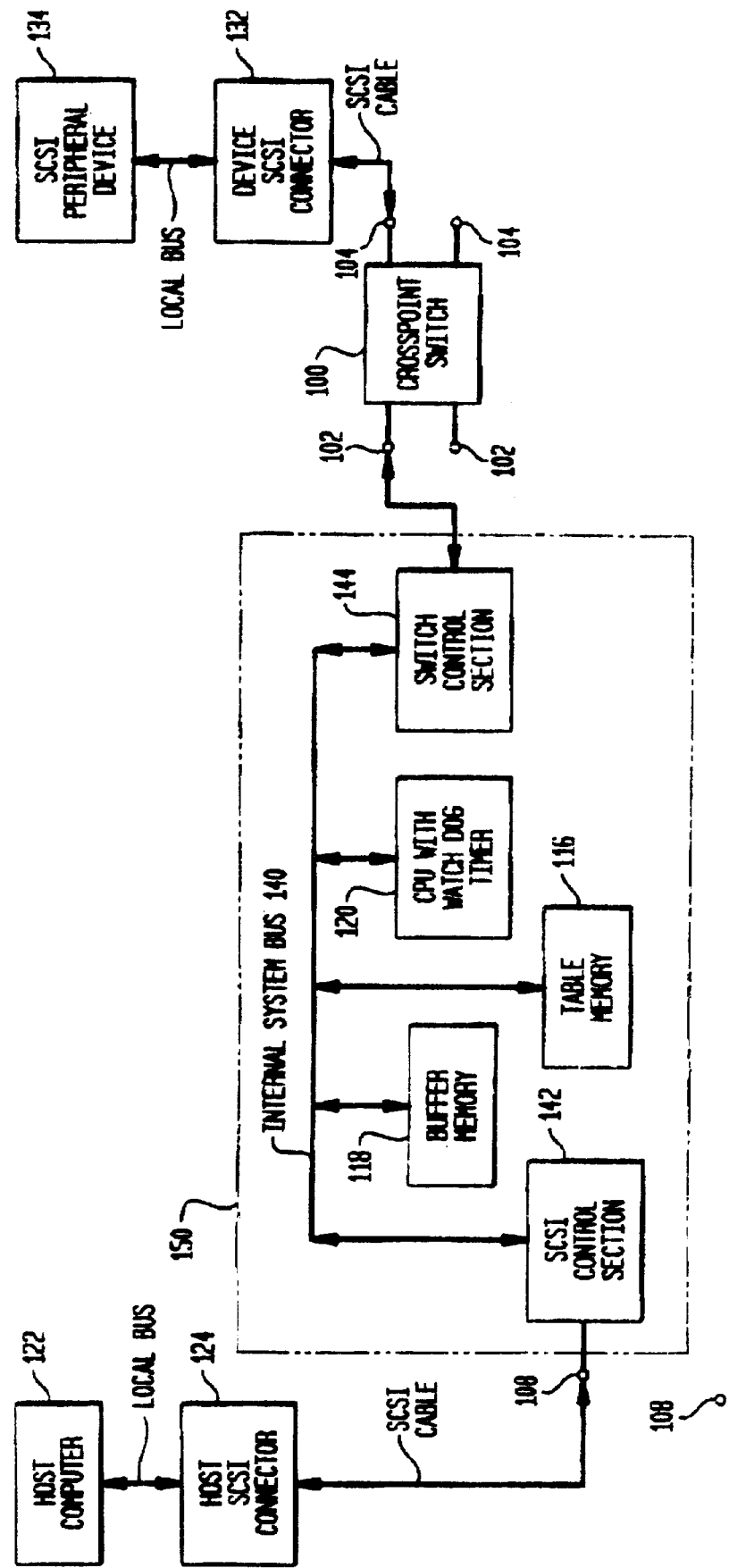

HIGH SPEED SWITCH FOR HIGH SPEED CONNECTION BETWEEN COMPUTERS AND PERIPHERAL DEVICES

CROSS REFERENCE TO COPENDING APPLICATION

This application is related to copending application entitled ELECTRONIC SWITCH, Ser. No. 08/741,974, filed Oct. 31, 1996. The copending application and the present application are owned by a common assignee.

BACKGROUND OF THE INVENTION

The Small Computer Systems Interface [SCSI] bus is used extensively for computer peripheral devices it is designed for use with hard drives, tape drives, scanners. CD Roms, printers and computers. Indeed, all computers from small personal computers to workstations to mainframes are equipped SCSI interfaces.

It is often necessary to connect multiple numbers of computers to multiple numbers of SCSI peripheral devices. Connection of an SCSI device to a computer equipped with an SCSI interface is point to point through a standard SCSI cable a few meters in length. Hence the conventional means of accessing an SCSI device is accomplished through the computer to which the SCSI device is attached. Clustering of these SCSI devices requires a Local Area Network [LAN] switch that connects the computers where the SCSI devices are attached through Network Interface Cards [NICs] which are installed within the computers.

The use of LAN switches and these interface cards increases the cost and complexity of interconnecting multiple computers to multiple peripheral devices. Moreover, such use greatly reduces the speeds of interconnection. For example, the most widely used LAN interface, fast Ethernet, has a maximum speed of 200 megabits per second, whereas SCSI devices are capable of speeds up to 320 megabits per second.

The present invention is directed toward a new type of high speed switch which not only permits the peripheral devices to be operated at their maximum speeds and also eliminates the need for LAN switches and interface cards.

SUMMARY OF THE INVENTION

In accordance with the principles of this invention, a new type of switch assembly is utilized in connecting computers to SCSI peripheral devices in such manner that data can be piped directly from computers to SCSI peripheral devices without the use of LAN switches or NICs. 1. A switch assembly for connecting computers to SCSI peripheral devices in order to pipe data directly from computer to devices without the use of LAN switches or NICs, said assembly comprises a crosspoint switch having a plurality of input terminals and a like plurality of output terminals; a like plurality of connection ports; and also comprises a like plurality of interconnection means.

Each means is connected between a corresponding connection port and a corresponding selected input terminal. Each means includes an SCSI control section connected to said corresponding connection port and a switch control section connected to said selected input terminal.

The means further includes a CPU, a table memory, a buffer memory and an internal system bus connected to both sections, both memories and said CPU, said switch connecting said corresponding input terminal to a selected one of the output terminals in accordance with signals supplied from the switch control section to said corresponding input port.

The CPU can be provided with a watch dog timer for use when a hung connection is detected.

Each connection port is connected via a corresponding SCSI cable to a corresponding SCSI host connector, each host connector being coupled to a corresponding host computer via a local bus.

Each output terminal is connected via a corresponding SCSI cable to a corresponding SCSI device connector, each device connector being coupled to a corresponding SCSI peripheral device via a second local bus.

The assembly then functions as follows. The host computer via its host connector issues an SCSI command to its corresponding connection port. At the connection port, SCSI section via the internal system bus supplies the command to the CPU, the two memories and the switch control section. Under control of the CPU, the memory table packs the command with the proper address for the selected SCSI peripheral device, the buffer memory stores the packed command as required for buffering and the switch section via the corresponding input port sends the signals selecting the designated output port.

The packed command block is forwarded to the selected output terminal. At the same time the CPU disconnects the connection port from the previously connected SCSI host cable. The packed command block then arrives at the selected output terminal and is sent to the selected SCSI peripheral device.

The host computer typically will send a host write to the device. The device will in turn send back an appropriate data signal. The CPU will reconnect the SCSI host cable to forward the data signal to the originating host computer and finish the SCSI command originally issued.

The assembly functions as a reliable gigabit per second connection between host computers and SCSI peripheral devices, thus overcoming the speed limitations created by use of now eliminated LAN switches and NICs. Moreover, this elimination sharply reduces cost and complexity of equipment needed.

BRIEF DESCRIPTION OF THE DRAWING

The accompanying drawing is a block diagram of a preferred embodiment of the invention.

DETAILED DESCRIPTION OF PREFERRED EMBODIMENT

Referring now to the diagram, there is shown a switch assembly for connecting computers to SCSI peripheral devices in order to pipe data directly from computer to devices without the use of LAN switches or NICs.

The assembly comprises a crosspoint switch 100 having a plurality of input terminals 102 and a like plurality of output terminals 104. The assembly also includes a like plurality of connection ports 108 and a like plurality of interconnection means 150.

Each means is connected between a corresponding connection port 108 and a corresponding input terminal 102. Each means including an SCSI control section 142 connected to said corresponding connection port 108 and a switch control section 144 connected to said corresponding input terminal 102. An internal system bus 140 connects section 142 to a CPU with watch dog timer 120, a table memory 116, a buffer memory 118, and a switch control section 144.

Each connection port 108 is connected via a corresponding SCSI cable to a corresponding SCSI host connector 124, each host connector being coupled to a corresponding host computer 122 via a local bus.

Each output terminal 104 is connected via a corresponding SCSI cable to a corresponding SCSI device connector 132, each device connector being coupled to a corresponding SCSI peripheral device 134 via a second local bus.

The assembly then functions as previously described.

While the invention has been described with particular reference to the preferred embodiment, the protection sought should be limited only by the terms of the claims which follow.

What is claimed is:

1. A switch assembly for connecting computers to SCSI peripheral devices in order to pipe data directly from computer to peripheral devices without the use of LAN switches or NICs, said assembly comprising:

at least one of said computers;

at least one of said peripheral devices;

a crosspoint switch having a plurality of input terminals and an equal plurality of output terminals, each one of said peripheral devices being adapted for connection to a corresponding one of said output terminals;

an equal plurality of connection ports, each one of said computers being adapted for connection to a corresponding one of said connection ports;

an equal plurality of interconnection devices, each interconnection device being connected between a corresponding connection port and a corresponding input terminal, each interconnection device including an SCSI control section connected to said corresponding connection port and a switch control section connected to said corresponding input terminal, a CPU, a table memory, a buffer memory and an internal system bus connected to both sections, both memories and said CPU, said switch connecting the corresponding input terminal to a selected one of the output terminals in accordance with signals supplied from said crosspoint switch control section to the corresponding input port.

2. The assembly of claim 1 wherein each computer is connected via a local bus, a corresponding SCSI connector and a corresponding SCSI cable to the corresponding connection port.

3. The assembly of claim 2 further including a watch dog timer connected to said CPU.

4. The assembly of claim 2 wherein each peripheral device is connected via another local bus, a corresponding SCSI device connector and a corresponding SCSI cable to the corresponding output terminal.

* * * * *